United States Patent [19]
Dekker et al.

[11] Patent Number: 4,959,556
[45] Date of Patent: Sep. 25, 1990

[54] CIRCUIT ARRANGEMENT FOR DERIVING A DIRECT VOLTAGE FROM THE MAINS ALTERNATING VOLTAGE

[75] Inventors: Jan H. Dekker, Hoogeveen; Ate K. Damstra, Drachten, both of Netherlands

[73] Assignee: U.S. Philips Corporation, New York, N.Y.

[21] Appl. No.: 306,192

[22] Filed: Feb. 2, 1989

[30] Foreign Application Priority Data

Feb. 5, 1988 [NL] Netherlands ................ 8800275

[51] Int. Cl.⁵ .............. H03K 5/01; H03K 17/72; H03K 17/687
[52] U.S. Cl. .................... 307/261; 307/570; 307/648; 307/592
[58] Field of Search ............ 307/296.3, 638, 643, 307/648, 592, 596, 261, 605, 570; 328/26

[56] References Cited

U.S. PATENT DOCUMENTS 4,118,768 10/1978 Wilson, Sr. ................ 307/643

FOREIGN PATENT DOCUMENTS 1450130 8/1966 France ................ 307/643
1252637 11/1971 United Kingdom .

Primary Examiner—John Zazworsky
Attorney, Agent, or Firm—Bernard Franzblau

[57] ABSTRACT

A circuit arrangement for deriving a direct voltage from an alternating voltage, particularly the mains alternating voltage. The circuit arrangement includes a switching transistor (T1) whose main current path is connected via a rectifier diode (D1) between the input and the output and whose control electrode is controlled by a thyristor (Th). The gate electrode of the thyristor is connected via a diac (D3) to a time-determining circuit comprising a series arrangement of a resistor (R1) and a capacitor (C1). A diode (D2) is arranged across the capacitor in such a way that the diode (D2) conducts during the periods when the rectifier diode (D1) is blocked.

17 Claims, 4 Drawing Sheets

CIRCUIT ARRANGEMENT FOR DERIVING A DIRECT VOLTAGE FROM THE MAINS ALTERNATING VOLTAGE

BACKGROUND OF THE INVENTION

This invention relates to a circuit arrangement for deriving a direct voltage from an alternating voltage, particularly the mains alternating voltage, said circuit arrangement comprising:

two input terminals, two output terminals one of which is connected to one of the input terminals, a switching transistor whose main current path is coupled between the other input terminal and the other output terminal, a base control circuit for controlling the switching transistor, which base control circuit includes a thyristor which is coupled via a resistor between the two input terminals, the node between the resistor and thyristor being coupled to the control electrode of the switching transistor, and a time-determining circuit comprising a series arrangement of a resistor and a capacitor and a trigger element connected between the gate terminal of the thyristor and the node between the said resistor and capacitor.

A circuit arrangement of this type is known from British Patent Specification GB No. 1,252,637. In this known circuit arrangement the series arrangement of resistor and capacitor, which forms part of the time-determining circuit, is directly connected between the input terminals and the trigger element is constituted by a neon lamp. A fullwave rectified alternating voltage must be presented to the input terminals. At the start of each half cycle the capacitor in the RC series circuit will be charged until the ignition voltage of the neon lamp is reached. Ignition of the neon lamp will render the thyristor conducting so that in its turn the switching transistor is turned off.

The operation of this known time-determining circuit is very inaccurate. On the one hand the neon lamp is an element having ample tolerances. On the other hand the residual voltage across the capacitor at the start of a subsequent cycle is not always the same, which together with the tolerances of the resistor and the capacitor leads to ample margins in the instant when the neon lamp and hence the thyristor are ignited. Consequently, considerable variations in the amplitude of the direct voltage may occur at the output terminals, which particularly applies when relatively low direct voltages must be obtained from relatively high alternating voltages. This is undesirable or inadmissible for many applications, for example, for the power supply of low-voltage elements such as small lamps, light-emitting diodes and the like.

A circuit arrangement of the type described in the opening paragraph can be used, for example, for supplying a control circuit and/or indicator lamps. The circuit arrangement according to the invention is particularly suitable for use in a domestic appliance, like a vacuum cleaner.

SUMMARY OF THE INVENTION

It is an object of the invention to provide a circuit arrangement that will produce a direct voltage at the output terminals with an amplitude which will vary only within very narrow margins. Such a circuit arrangement will be particularly suitable for mass production without an extensive fine tuning being required in the arrangement to meet the tolerance requirements of the output voltage.

In a circuit arrangement of the type described in the opening paragraph for deriving a direct voltage from an alternating voltage, particularly the mains alternating voltage, these objects are realized in that the trigger element is constituted by a diac, in that the other input terminal is coupled to an alternating voltage terminal via a rectifier diode arranged in the forward direction with the main current path of the switching transistor, in that the said series arrangement of resistor and capacitor is coupled between the alternating voltage terminal and the one input terminal and in that a diode is arranged across the capacitor in such a way that this diode conducts during the periods when the rectifier diode is blocked.

By controlling the RC circuit in the time-determining circuit with a non-rectified alternating voltage and by shunting the capacitor in the RC circuit with a diode, which conducts when the rectifier diode from which the switching transistor receives its voltage supply is blocked, it is achieved that the capacitor in the time-determining circuit is completely discharged when the rectifier diode starts conducting. This implies that only the tolerances of the resistor and the capacitor in the time-determining circuit and the tolerances of the diac will influence the accuracy of the instant when the thyristor is ignited. Components having a relatively small tolerance may be chosen for the capacitor and the resistor and diacs having a small tolerance are also commercially available. These components which are normally commercially available, make it possible to build a circuit arrangement functioning very accurately.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
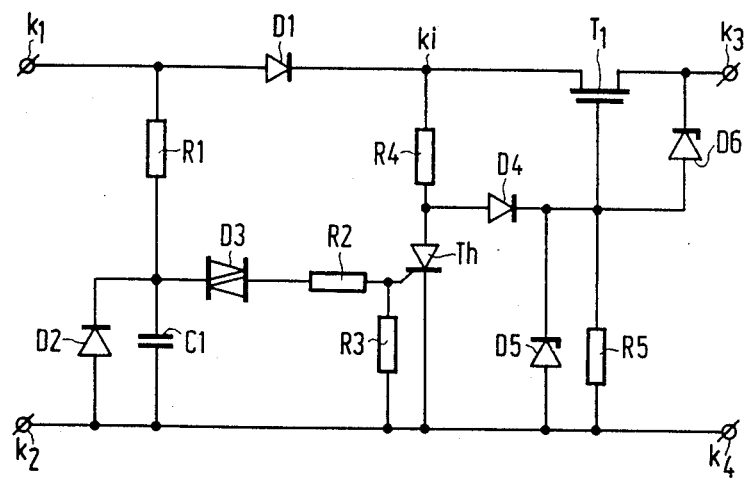
FIG. 1 shows a first embodiment of a circuit arrangement according to the invention.

FIG. 1 shows a first embodiment of a circuit arrangement according to the invention. The circuit arrangement has two input terminals k1 and k2 and two output terminals k3 and k4. The terminals k2 and k4 are interconnected A series arrangement of the rectifier diode D1 and the switching transistor T1 is provided between the terminals k1 and k3. In this embodiment the switching transistor T1 is in the form of a MOS power transistor, but it may alternatively be a bipolar transistor. The series arrangement of a resistor R1 and a capacitor C1 is connected between the terminals k1 and k2. The capacitor C1 is shunted by the diode D2. A series arrangement of a resistor R4 and a thyristor Th is provided between the input node Ki of rectifier D1 and transistor T1 and the lead between the terminals k2 and k4. The gate terminal of the thyristor Th is controlled via a diac D3 arranged in series with a current-limiting resistor R2. The diac D3 is connected to the node between resistor R1 and capacitor C1. The gate terminal of the thyristor Th is also connected via a resistor R3 to the lead between the terminals k2 and k4. The output signal of the thyristor Th, present at the node between R4 and Th, is applied via a diode D4 to the gate terminal of the transistor T1. This gate terminal is also connected via a resistor R5 and a zener diode D5 to the lead between k2 and k4. Finally, a zener diode D6 is arranged between the gate and the source of transistor T1.

The circuit arrangement of FIG. 1 operates as follows. During operation an alternating voltage is presented to the input terminals k1 and k2. At the start of the positive cycle of this alternating voltage the capacitor C1 will be charged via the resistor R1. The diode D2 is blocked and therefore does not have any influence on the charging process. At the instant when the voltage across the capacitor C1 reaches the ignition voltage of the diac D3, this diac D3 will be ignited so that a trigger signal is presented via resistor R2 to the gate terminal of the thyristor Th. This thyristor Th will consequently begin to conduct and will apply a signal via diode D4 to the gate of transistor T1.

During the period when the diac D3 and also the thyristor Th are not yet conducting, the voltage at the gate of switching transistor T1 will follow the AC mains voltage via R4 and diode D4, so that also the source of transistor T1 and hence he voltage at the output terminal k3 will follow the mains voltage. However, at the instant when the thyristor Th is rendered conducting, the gate of transistor T1 will be pulled down so that the transistor T1 is turned off. At that instant the voltage at the output terminal k3 will decrease to substantially zero. The gate of T1 will be discharged via resistor R5.

During the negative half cycle of the sinusoidal alternating voltage at the input terminals, the diode D1 will be blocked so that no output voltage appears at the output terminals. In this cycle the diode D2 will conduct and the capacitor C1 will be discharged across this diode D2. The result is that the capacitor C1 has a fixed known initial voltage at each start of a positive half cycle of the alternating voltage. If small tolerance components are chosen for R1 and C1 and if a component having an accurately known breakdown voltage with a small tolerance is also chosen for diac D3, the ignition instant of the thyristor Th is fixed within given narrow limits. It will be evident that the value of the output pulses at the output terminals k3 and k4 is unambiguously related to the ignition instant of the thyristor Th. The amplitude of the output pulses is also fixed by accurately defining this instant.

The two zener diodes D5 and D6 have not been described hereinbefore. Both diodes have a protective function. The zener diode D5 ensures that the voltage at the gate of the transistor T1 can never become higher than a predetermined maximum value set by this zener diode. This prevents a relatively high voltage peak from appearing once at the output k3/k4 when switching on the alternating voltage at the terminals k1 and k2, with capacitor C1 being generally discharged completely. The diode D6 which is arranged across the source and the gate of T1 limits the maximum gate-source voltage to the zener voltage of the diode D6.

Figure 2:
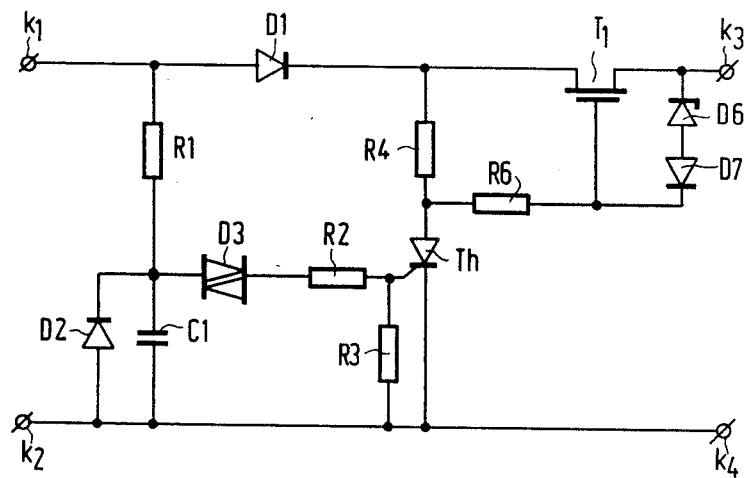
FIG. 2 shows a second embodiment of a circuit arrangement according to the invention.

FIG. 2 shows another embodiment of the circuit arrangement according to the invention. A comparison of FIGS. 1 and 2 shows that actually only the circuit around transistor T1 is modified. The other components are therefore denoted by the same reference numerals. In FIG. 2 the gate of transistor T1 is directly connected via a resistor R6 to the node between the resistor R4 and the thyristor Th. Furthermore, the gate-source path of transistor T1 is not only shunted by a zener diode D6 but also by a further diode D7 arranged in series with D6.

By coupling the gate of transistor T1 via a resistor R6 to the node between resistor R4 and thyristor Th, it is achieved that the gate can be discharged after igniting the thyristor Th via resistor R6 and the thyristor Th. As compared with FIG. 1, the number of components connected to the gate T1 is reduced from 3 to 1.

The diode D7 is only incorporated to counteract a possible negative influence on the operation of the transistor T1 caused by the presence of the zener diode D6. If necessary, such a diode may also be used at the same location in the circuit arrangement of FIG. 1. On the other hand, the diode D7 is not always necessary.

Figure 3:
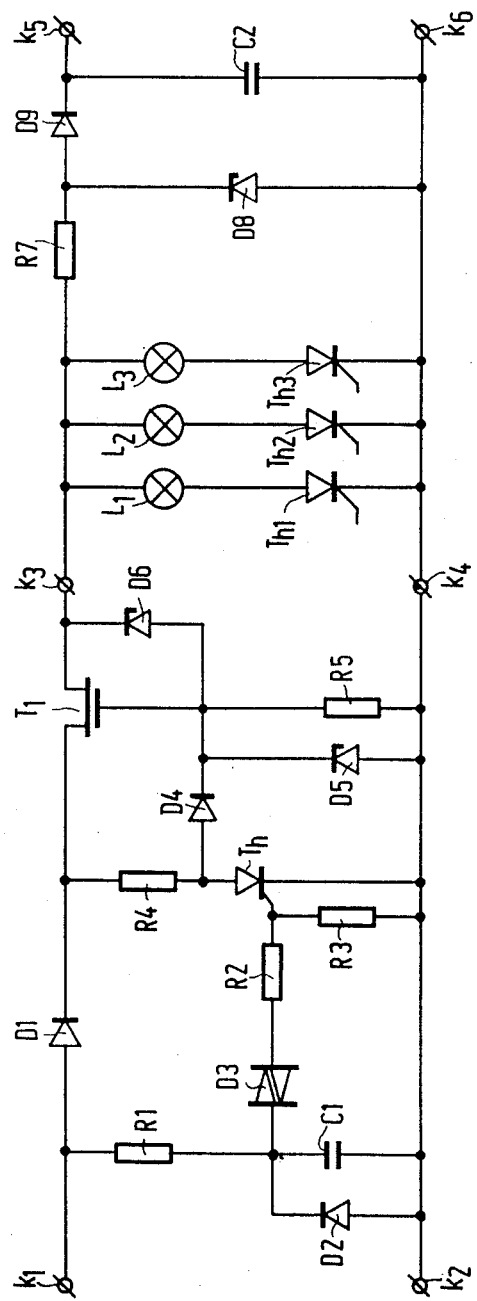
FIG. 3 shows an application of the circuit arrangement of FIG. 1 for controlling a number of small incandescent lamps and for supplying a smoothed direct voltage.

FIG. 3 shows the application of the circuit arrangement of FIG. 1 for the control of a plurality of small incandescent lamps. The part of the circuit arrangement between the terminals k1/k2 and k3/k4 is identical to the circuit arrangement of FIG. 1 and will therefore not be described in greater detail. The part receiving the supply from the circuit arrangement of FIG. 1 is arranged between the terminals k3/k4 and the further terminals k5/k6. A plurality of lamps and thyristors are arranged in series across the terminals k3 and k4. The lamps are denoted by L1, L2, L3 and the thyristors are denoted by Th1, Th2 and Th3. If, for example, the thyristor Th1 is rendered conducting by a suitable signal at its gate terminal, the pulsatory direct voltage output signal across the terminals k3 and k4 will result in a pulsatory current through the incandescent lamp L1 so that the lamp will light up. Since the amplitude of the pulsatory current is accurately fixed because of the circuit arrangement according to the invention, even if relatively low values of this amplitude are concerned, known and normally available low-voltage lamps (for example, 6 V or 12 V lamps) can be used in this circuit arrangement, even if the full mains voltage of 220 V (or 110 V) is presented to the terminals k1 and k2. The lamps L2 and L3 can also be switched on by means of suitable signals at the gate terminals of the thyristors Th2 and Th3. The circuits for controlling the thyristors Th1, Th2 and Th3 do not play a role within the scope of the invention and are consequently not shown in detail.

On the right-hand side of the Figure a known smoothing circuit is shown, which comprises the resistor R7, the Zener diode D8, the rectifier diode D9 and the capacitor C2, and this smoothing circuit insures that a smoothed direct voltage is available at the output terminals k5 and k6. This circuit is well known to those skilled in the art and does not require any further explanation.

This circuit arrangement can be used in, for example, a vacuum cleaner. The lamps L1, L2 and L3 may then be indicator lamps indicating useful information to the user, such as the presence of a dust bag and/or whether it is full, and the power supplied to a vacuum cleaner with automatic or non-automatic power control.

Figure 4:
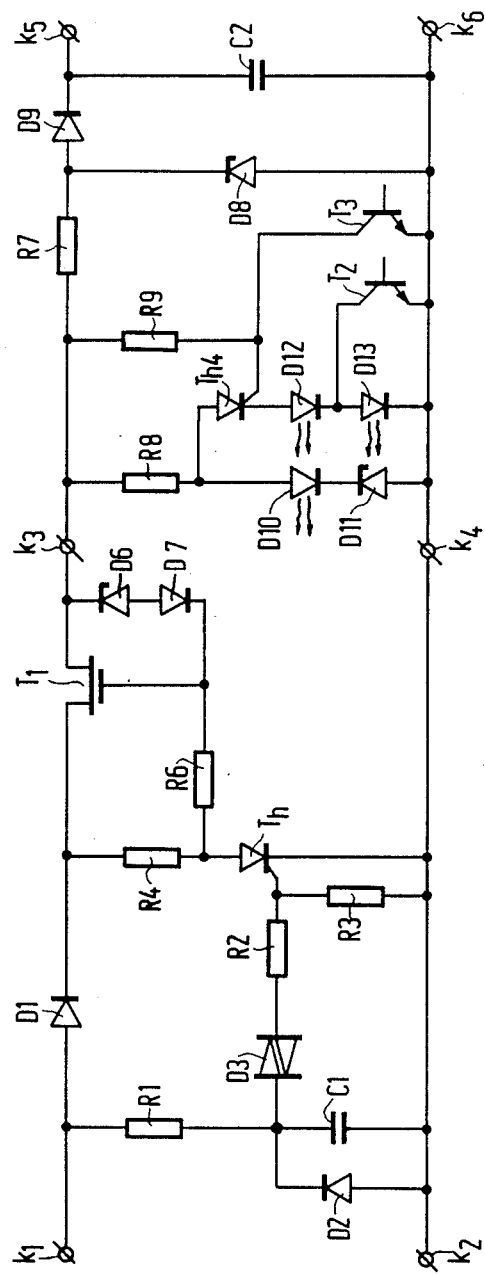
FIG. 4 shows an application of the circuit arrangement of FIG. 2 for controlling a number of light-emitting diodes and for supplying a smoothed direct voltage as well.

In FIG. 4 the circuit arrangement of FIG. 2 is used for the control of a plurality of light-emitting diodes. These diodes could be arranged in the same way as the lamps L1, L2, L3 in FIG. 3 However, a special application is shown in FIG. 4. First, a light-emitting diode D10 and a zener diode D11 are arranged in series across the terminals k3 and k4, which series arrangement is fed through a resistor R8. The same resistor R8 also feeds a second series arrangement of a thyristor Th4 and the light-emitting diodes D12 and D13. A switching transistor T2 whose base can be controlled in a manner not further shown is arranged parallel to D13. Furthermore, the gate terminal of thyristor Th4 is connected via a switching transistor T3 to the lead between the terminals k4 and k6. The base of transistor T3 can also be controlled in a manner not further shown. The resistor R9 is required for the gate control of the thyristor Th4.

If the transistor T3 is turned on, the thyristor Th4 will not conduct. In that case the pulsatory output voltage at the terminals k3/k4 will only lead to a current through the circuit R8-D10-D11. It is assumed that the amplitude of the pulsatory voltage at the terminals k3/k4 is higher than the zener voltage of the diode D11. In that case only the diode D10 will convey a current and will emit light. However, if the thyristor Th4 is rendered conducting by switching the transistor T3 off, a current may also start flowing through the circuit R8-Th4-D12-D13. The zener voltage across D11 must be chosen to be so high that a current will only start flowing through the circuit R8-Th4-D12-D13 when Th4 becomes conducting. In that case D10 will therefore not emit light but only D12 and possibly D13 will be able to emit light. D13 will emit light if transistor T2 is turned off. However, if this transistor T2 is turned on, only D12 will light up.

Similarly to that in FIG. 3, a smoothing circuit is also provided in FIG. 4 and its components have been denoted by the same reference numerals as those in FIG. 3.

Both in FIG. 3 and in FIG. 4 the smoothed direct voltage at the terminals k5/k6 may be used, for example, for supplying a control circuit (not shown) with which the thyristors Th1, Th2, Th3 are controlled in the case of FIG. 3 and with which the transistors T2, T3 are controlled in the case of FIG. 4.

Figure 5:
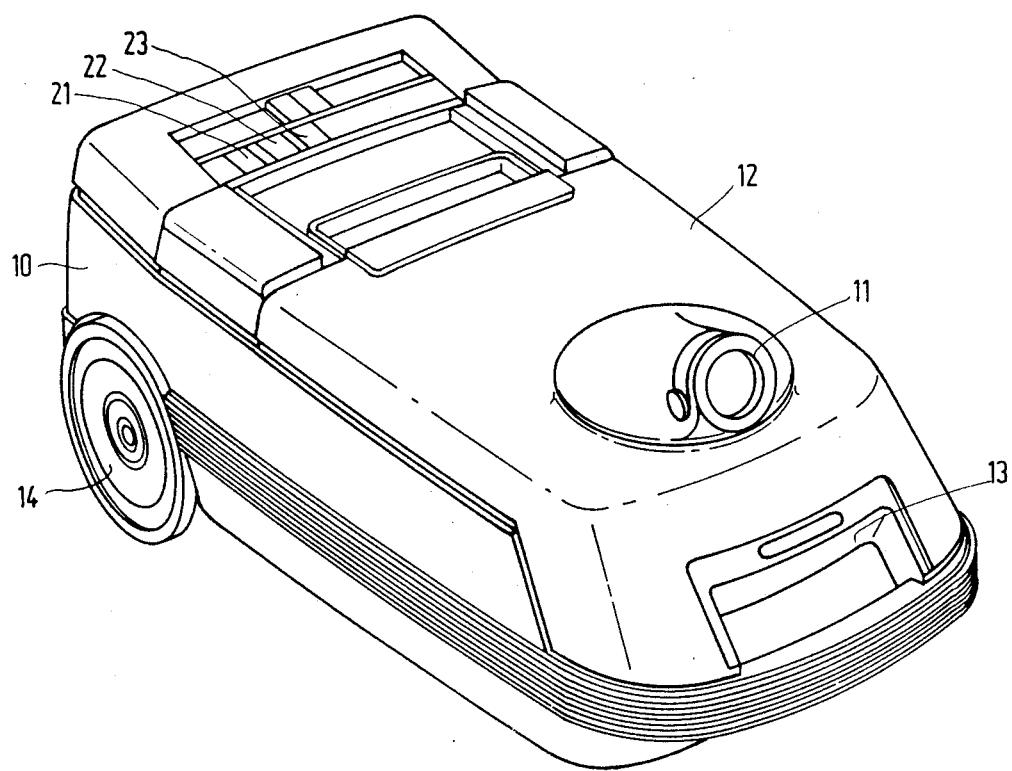
FIG. 5 shows a vacuum cleaner with indicator lamps.

FIG. 5 shows a vacuum cleaner 10. It has, inter alia, a connection 11 for a hose, a lid 12 and a handle 13 of a space for accommodating a dust bag, and wheels for easily moving the vacuum cleaner. Furthermore, it has a number of small indicator lamps 21, 22 and 23 which light up, for example, when conditions occur which are of interest to the user. Such conditions are, for example, "dust bag present", "dust bag full", and the power supplied by the motor in a power-controlled vacuum cleaner. According to the invention, the lamps 21, 22 and 23 are supplied by the circuit arrangement as described hereinbefore.

What is claimed is:

1. A circuit arrangement for deriving a direct voltage from an alternating voltage, said circuit arrangement comprising:
   two input terminals,
   two output terminals one of which is connected to one of the input terminals,
   a switching transistor whose main current path is connected between the other input terminal and the other output terminal,
   a control circuit for controlling the switching transistor, which control circuit includes a thyristor which is connected via a first resistor between the two input terminals, a node between the first resistor and thyristor being connected to a control electrode of the switching transistor, and
   a time-determining circuit comprising a series arrangement of a second resistor capacitor and a trigger element connected between a gate terminal of the thyristor and a node between said second resistor and capacitor, characterized in that the trigger element comprises a diac, in that the other input terminal is connected to an alternating voltage terminal via a rectifier diode arranged in the forward direction with the main current path of the switching transistor, in that the series arrangement of second resistor and capacitor is connected between the alternating voltage terminal and the one input terminal and in that a diode is coupled across the capacitor in such a way that said diode conducts during the periods when the rectifier diode is blocked.

2. A circuit arrangement as claimed in claim 1, wherein the control electrode of the switching transistor is connected to the one input terminal via a further resistor.

3. A circuit arrangement as claimed in claim 1, wherein the control electrode of the switching transistor is connected via a further resistor to said node between the first resistor and the thyristor.

4. A circuit arrangement as claimed in claim 1, wherein a zener diode is connected between the control electrode and an output electrode of the switching transistor, the zener voltage of said zener diode being not higher than the maximum admissible control electrode-output electrode voltage of the switching transistor.

5. A circuit arrangement as claimed in claim 4 wherein the control electrode of the switching transistor is connected to the one input terminal via a further zener diode whose zener voltage is equal to the maximum peak voltage allowed to occur across the output terminals during circuit operation.

6. A circuit arrangement as claimed in claim 1 wherein one or more series arrangements each comprising a lamp and a thyristor are connected between the output terminals.

7. A circuit arrangement as claimed in claim 1, wherein a first series arrangement of a light-emitting diode and a zener diode and at least a second series arrangement of a second light-emitting diode and a thyristor are coupled between the output terminals, the zener voltage of the zener diode being higher than the voltage across the second series arrangement if the thyristor in said second series arrangement conducts.

8. A circuit arrangement as claimed in claim 7, wherein the second series arrangement includes a plurality of light-emitting diodes which, with the exception of one said diode, are each shunted by a main current path of a further switching transistor.

9. A circuit arrangement as claimed in claim 2, wherein a zener diode is connected between the control electrode and an output electrode of the switching transistor, the zener voltage of said zener diode being not higher than the maximum admissible control electrode-output electrode voltage of the switching transistor.

10. A circuit arrangement as claimed in claim 3, wherein a zener diode is connected between the control electrode and an output electrode of the switching transistor, the zener voltage of said zener diode being not higher than the maximum admissible control electrode-output electrode voltage of the switching transistor.

11. A circuit arrangement as claimed in claim 1 wherein the control electrode of the switching transistor is connected to the one input terminal via a zener diode whose zener voltage is equal to the maximum peak voltage allowed to occur across the output terminals during circuit operation.

12. A circuit arrangement as claimed in claim 5, further comprising at least one series arrangement of a light-emitting element and a further thyristor connected across said output terminals.

13. A circuit arrangement as claimed in claim 1, further comprising:
   a first zener diode coupled between the control electrode and an output electrode of the switching transistor,
   a second zener diode coupled between said control electrode and the one input terminal,
   a first series arrangement of a light-emitting element and a third zener diode coupled across said output terminals, and
   a second series arrangement of at least one light-emitting element and a further thyristor coupled across said output terminals.

14. A circuit arrangement as claimed in claim 13, wherein the second series arrangement includes at least two light-emitting elements, said circuit further comprising a second switching transistor connected in parallel with one of said light-emitting elements.

15. An AC/DC circuit comprising:
   first and second input terminals for connection to a source of AC voltage,
   first and second output terminals,
   a rectifier diode and a switching transistor connected in series circuit between said first input terminal and said first output terminal,
   first means connecting said second output terminal to said second input terminal,
   means including said rectifier diode for coupling a thyristor to said input terminals,
   second means connecting a first circuit node between the thyristor and the rectifier diode to a control electrode of the switching transistor,
   a timing circuit comprising a series arrangement of a resistor and a capacitor connected across said input terminals,
   a diac connected between a gate electrode of the thyristor and a second circuit node between said resistor and capacitor, and
   a diode connected in parallel with the capacitor and with a polarity such that said diode conducts during periods when the rectifier diode is non-conductive, whereby initial capacitor voltage is the same at the start of each half cycle of AC voltage for which the rectifier diode is conductive.

16. An AC/DC circuit as claimed in claim 15, wherein,
   said coupling means includes a first impedance element connected between said first circuit node and said rectifier diode, said circuit further comprising,
   a second impedance element connected between said control electrode and said first connecting means, and wherein
   said second connecting means includes a further diode.

17. An AC/DC circuit as claimed in claim 15 wherein;
   said coupling means includes a first impedance element connected between said first circuit node and said rectifier diode, and
   said second connecting means includes a second impedance element.

* * * * *

UNITED STATES PATENT AND TRADEMARK OFFICE
CERTIFICATE OF CORRECTION

PATENT NO. : 4,959,556

DATED : September 25, 1990

INVENTOR(S) : JAN H. DEKKER, ET AL.

It is certified that error appears in the above-identified patent and that said Letters Patent is hereby corrected as shown below:

Claim 1, column 6, line 8, change "capacitor and" to
--and a capacitor,--;

line 21, delete "the" (first occurrence).

Signed and Sealed this

Seventeenth Day of March, 1992

Attest:

HARRY F. MANBECK, JR.

*Attesting Officer*          *Commissioner of Patents and Trademarks*